United States Patent
Min

[11] Patent Number: 5,877,623
[45] Date of Patent: Mar. 2, 1999

[54] METHOD FOR MEASURING RECORDING LINEAR VELOCITY OF DATA ON COMPACT DISK

[75] Inventor: Kyoung-seo Min, Suwon-city, Rep. of Korea

[73] Assignee: Samsung Electronics Co., Ltd., Kyungki-Do, Rep. of Korea

[21] Appl. No.: 854,071

[22] Filed: May 9, 1997

[30] Foreign Application Priority Data

May 14, 1996 [KR] Rep. of Korea ................. 96-15980

[51] Int. Cl.$^6$ .................. G01P 3/42; G01P 3/48; G01P 3/54
[52] U.S. Cl. ............... 324/166; 324/160; 360/73.02; 369/239
[58] Field of Search ................. 324/160, 166, 324/173, 174, 178, 179; 360/73.02, 73.03; 369/53, 189, 239, 240

[56] References Cited

U.S. PATENT DOCUMENTS 4,388,713   6/1983   Tatsuguchi ............... 369/240

*Primary Examiner*—Walter E. Snow
*Attorney, Agent, or Firm*—Sughrue, Mion, Zinn, Macpeak & Seas, PLLC

[57] ABSTRACT

A method is disclosed for measuring the linear velocity of recording of data recorded a CD using a Hall sensor. A Hall sensor is placed in the spindle motor of a CD drive to produce a signal based on alternating magnetic flux in the spindle motor. An amplified and processed version of the signal output from the Hall sensor during operation of the CD drive is monitored to measure the timing of three successive inversions of the signal. Based on this timing measurement, the rotational speed of the spindle motor is determined. The recording linear velocity of the data recorded on the CD presently mounted in the CD drive is obtained based on the rotational speed determined from the Hall signal and on a reference rotational speed. As a result of using this method for obtaining the recording linear velocity of the data recorded on the CD, no errors are generated based on the number of tracks the pickup is moved across, and the time necessary for measuring the recording linear velocity is reduced.

12 Claims, 4 Drawing Sheets

HALL SIGNAL  TIME

SIGNAL MADE BY CONVERTING
HALL SIGNAL INTO
RECTANGULAR WAVEFORM

TIME

METHOD FOR MEASURING RECORDING LINEAR VELOCITY OF DATA ON COMPACT DISK

BACKGROUND OF THE INVENTION

The present invention relates to compact disks, and more particularly, to a method for measuring the recording linear velocity of data recorded on a compact disk. This application for a method for measuring recording linear velocity of data on a compact disk is based on Korean Patent Application No. 96-15980, which is incorporated herein by reference for all purposes.

A compact disk (or "CD"), a mass medium, has a 12 cm diameter and a 680 Mb storage capacity. Numerous fine grooves are formed on a CD to store digitized data, e.g., audio data or computer data. The grooves are called "pits" and a row of pits are referred to as a "track". The tracks are formed as concentric circles, progressively from the center of the disk toward the periphery thereof. Typically, a CD has approximately 22,000 tracks. The distance between the tracks, i.e., the track pitch, is typically 1.6 μm.

FIG. 1 is a plan view of a typical CD. FIG. 2 is a sectional view of the CD of FIG. 1, taken along section line II—II.

Referring to FIGS. 1 and 2, a CD 10 is an aluminum-coated synthetic resin disk of 12 cm diameter and 1.2 mm thickness. A 15 mm (inner diameter) pass through hole 10h is formed in the middle of the CD. The hole 10h is used to mount the CD 10 on a turntable of a spindle motor 31 in a disk drive. The CD 10 is divided into different areas. The CD 10 has a lead-in area 10a, also known as a TOC (Table Of Contents) area which contains summarized information regarding the contents of the CD. Typically, as in the case of an audio CD, the information contained in the TOC area includes the number of songs, the starting position of the songs, and the total performance time. A program area 10b is where data is recorded. A lead-out area 10c is reserved for recording of a signal for indicating the termination of a program, i.e., the end of the data.

According to the specifications of a typical audio CD, the recording linear velocity of the data is defined to be between 1.2 m/sec and 1.4 m/sec. A 1.2 m/sec recording linear velocity is typically employed when a great amount of data is to be recorded on a disk, whereas a 1.4 m/sec recording linear velocity is employed when relatively less data is recorded on a disk.

When the number of tracks from the current position to a target position on a disk are calculated, based on such a recording linear velocity, the distance between the current and target positions can vary according to the method of calculation. Accordingly, much time is taken up to access data by a pickup. Thus, the recording linear velocity of the data recorded on a disk should be accurately measured in order to accurately calculate number of tracks.

According to the conventional technology, the recording linear velocity of the data recorded on a disk has been measured according to the following two methods.

The first method is: after moving a pickup from one track position on a disk to the immediately previous track (i.e., in the reverse direction, from the outer track to the inner track), the time needed for the pickup to track around from the moved position back to the initial position is measured.

The second method is: after moving a pickup from one position on a disk to a position a predetermined number of tracks away (e.g., hundreds of tracks) in the reverse direction, the recording linear velocity of data is calculated based on the time necessary for the pickup to track around the initial position, and the number of the tracks.

However, in the first method, it takes a lot of time to complete the calculation of the recording linear velocity since the action of the pickup is performed at mono-multiple speed (i.e., the base reproduction speed, not doubled or tripled) in order to minimize errors. Also, precision in the movement by one track is required. Further, in the second method, since the pickup must move across many tracks, the necessary time becomes longer and error in the number of tracks becomes great.

Additionally, a stable servo action is required in either the stepwise track movement (first method) or the lump-sum track movement (second method), otherwise the resulting measurement is not reliable.

SUMMARY OF THE INVENTION

To solve the above problems, it is an object of the present invention to provide a method for measuring the recording linear velocity of data on a CD accurately and in a shorter time.

Accordingly, to achieve the above object, there is provided a method for measuring recording linear velocity of data of a CD including the steps of:

(a) reading data via a pickup, recorded in a lead-in area of a CD loaded in a CD drive;

(b) waiting for a first inversion (positive-to-negative transition) of a Hall signal, which is generated from a Hall sensor inside a spindle motor at the current position of the pickup;

(c) determining whether the Hall signal is inverted a first time;

(d) if the Hall signal is determined in the step (c) to be inverted a first time, starting the counting of a timer upon the inversion of the Hall signal;

(e) waiting for a second inversion of the Hall signal;

(f) determining whether the Hall signal is inverted a second time;

(g) if the Hall signal is determined in the step (f) to be inverted a second time, waiting for a third inversion of the Hall signal;

(h) determining whether the Hall signal is inverted a third time;

(i) if the Hall signal is determined in the step (h) to be inverted a third time, stopping the counting of the timer and obtaining the RPM at the current position of the pickup based on the measured counting value; and (j) obtaining the recording linear velocity of the data recorded on the CD based on the RPM at the current pickup position, obtained in the step (i), and a reference RPM.

According to the method of the present invention, the generation of errors in the number of tracks according to the track movement of the pickup can be prevented and the necessary time for measuring the recording linear velocity is reduced.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 3:
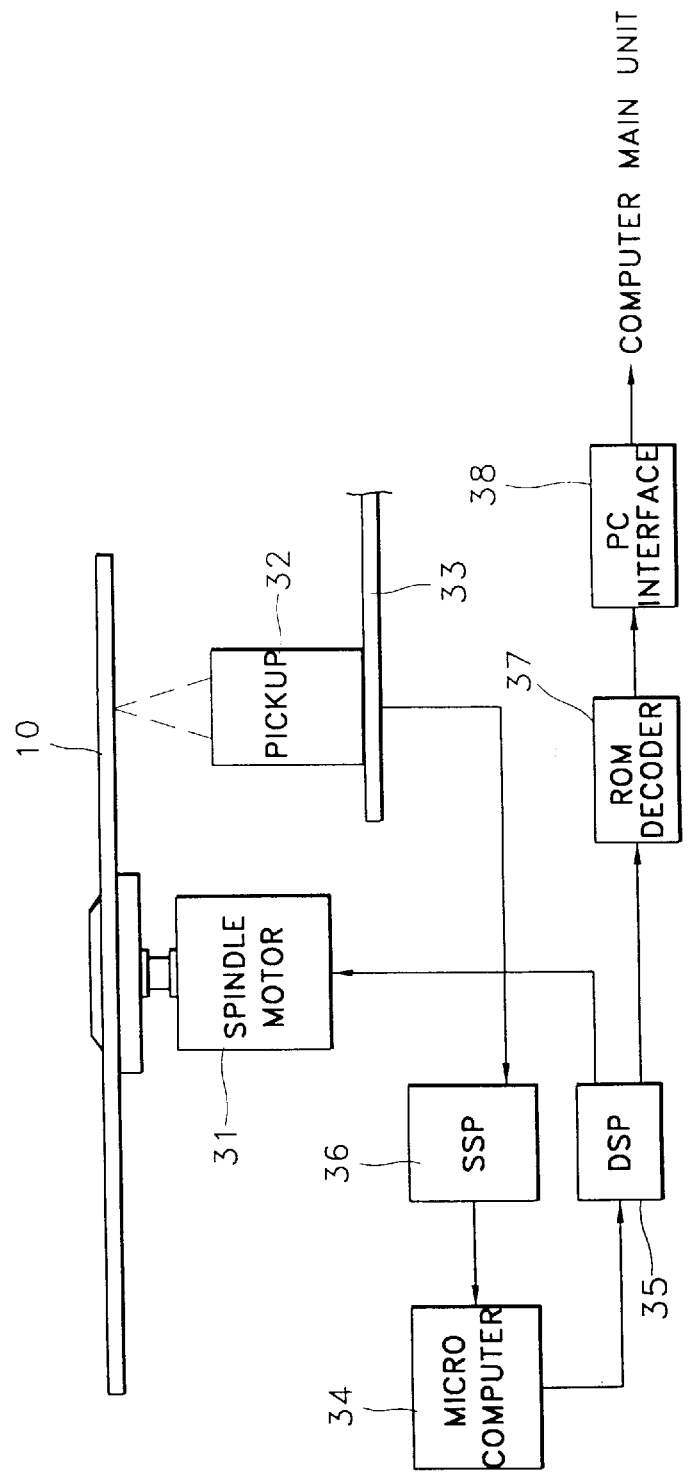
FIG. 3 is a schematic block diagram showing a typical CD drive employing a method of the present invention.
Figure 4:
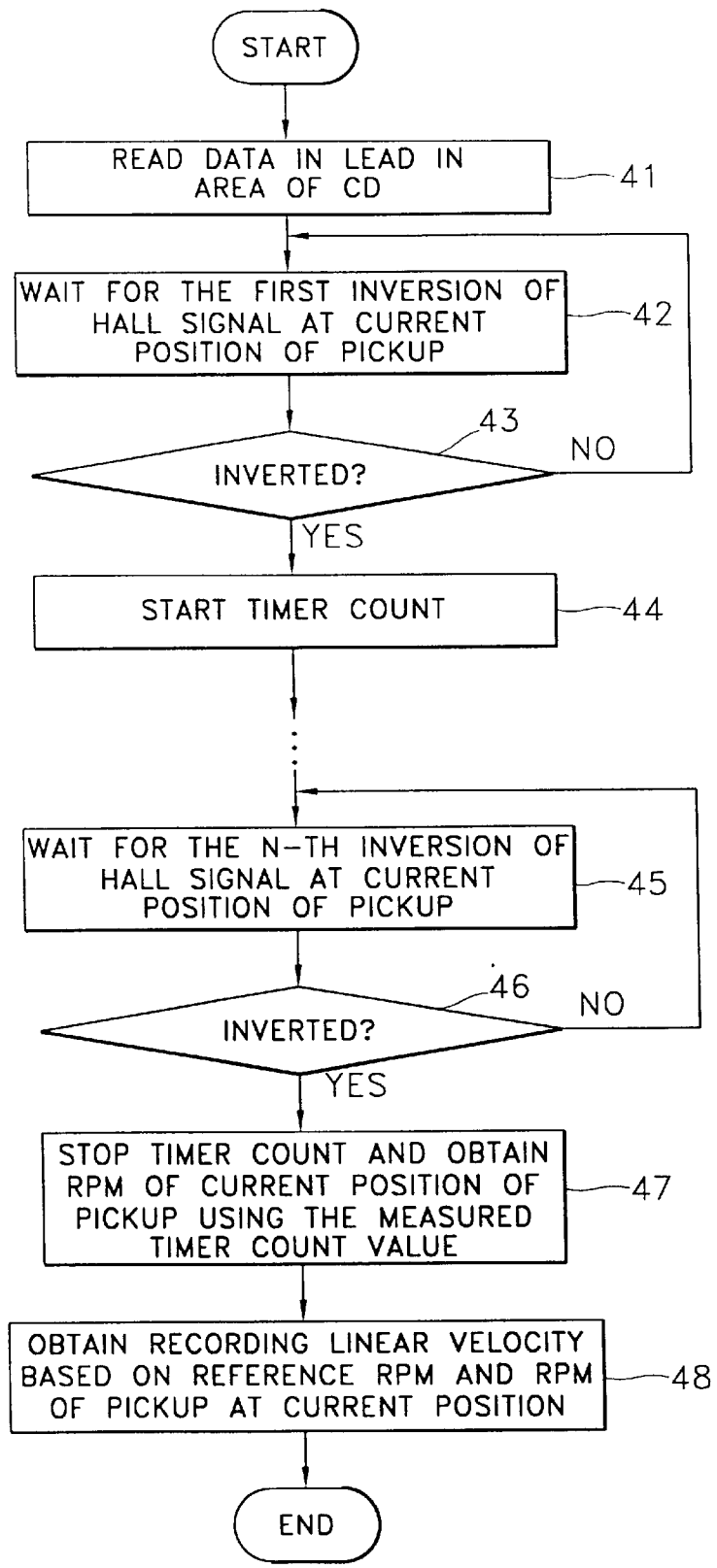
FIG. 4 is a flow chart for explaining the method of measuring the recording linear velocity of the data recorded on a CD according to the method of the present invention.

FIG. 3 shows a CD drive which employs a method according to the present invention. The CD drive includes a spindle motor 31 for rotating a disk 10, and a pickup 32 for reading information recorded in the disk 10 using a laser beam. The pickup 32 reciprocates along sled driving shaft 33.

A microcomputer 34 controls the entire CD drive system. A digital signal processor (DSP) 35 receives a predetermined command from the microcomputer 34 and outputs a signal for driving the spindle motor 31. The servo signal processor (SSP) 36 receives a predetermined signal from the pickup 32 which it transfers on to the microcomputer 34. A ROM decoder 37 transmits the information received from the DSP 35 to an external computer main unit (not shown) via a PC interface 38.

Figure 1:
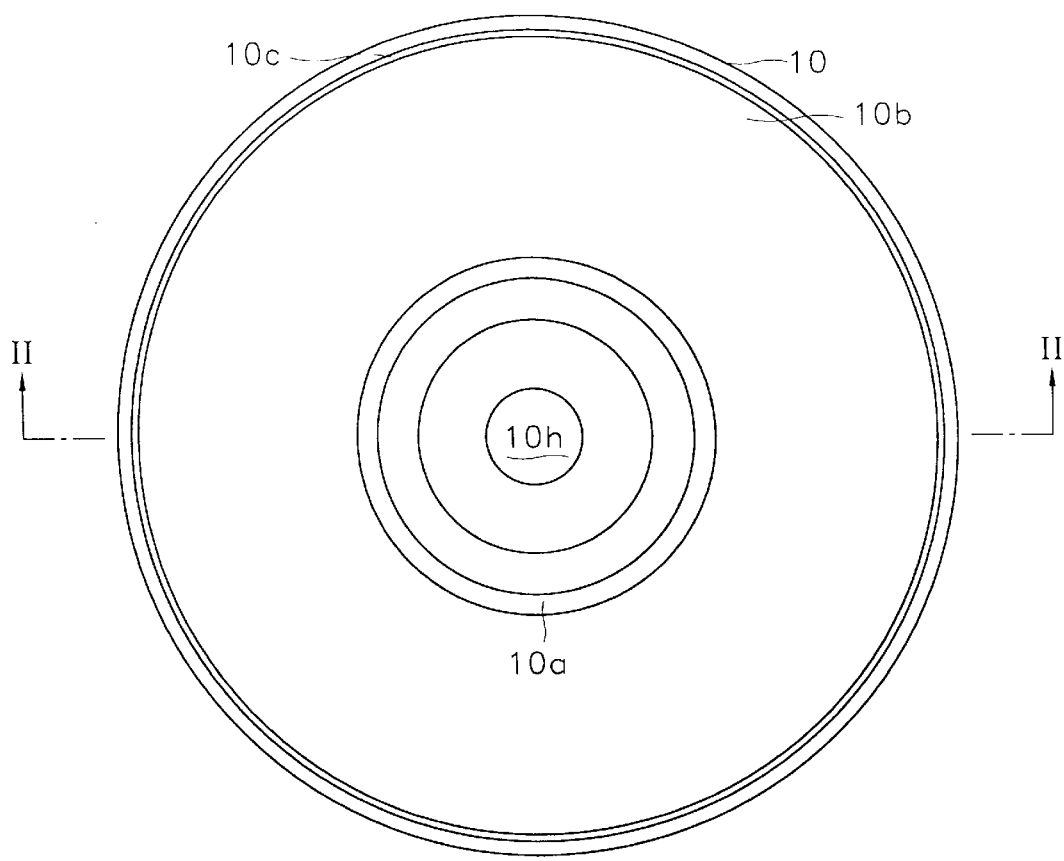
FIG. 1 is a plan view illustrating a typical CD.
Figure 2:
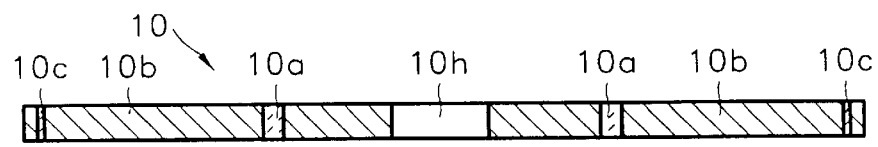
FIG. 2 is a cross sectional view of the CD taken along line II—II in FIG. 1.

When the CD 10 is loaded in the above CD drive, the pickup 32 reads data from a lead-in area 10a (see FIG. 1) of the CD 10 using a laser beam (step 41). Here, it is preferable that the data reading speed is set to a mono-multiple speed (i.e., slow speed, not double or triple speed) to accurately read the data.

Next, a sub-Q code, in which detailed data for the recognition of an arbitrary position on a disk is recorded, is read at the current position of the pickup 32 on the CD 10 and the data is temporarily stored in a memory device (not shown) inside or outside the microcomputer 34.

Figure 5:
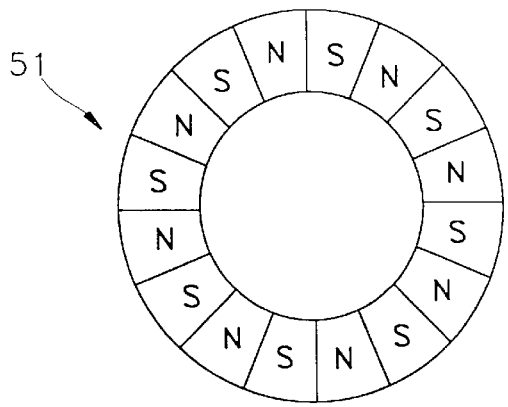
FIG. 5 is a diagram showing a configuration of alternate north (n) and south (S) divided magnetic poles installed inside a spindle motor of the typical CD drive.
Figure 6:
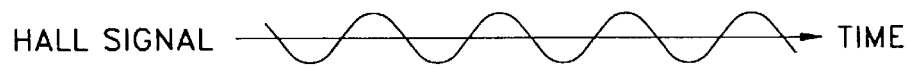
FIG. 6 is a waveform of a signal generated from a Hall sensor inside the spindle motor in response to the rotation of the N/S alternate divided magnetic poles of FIG. 5.
Figure 7:
FIG. 7 is a waveform output from a comparator which processes the waveform of FIG. 6.
Figure 8:
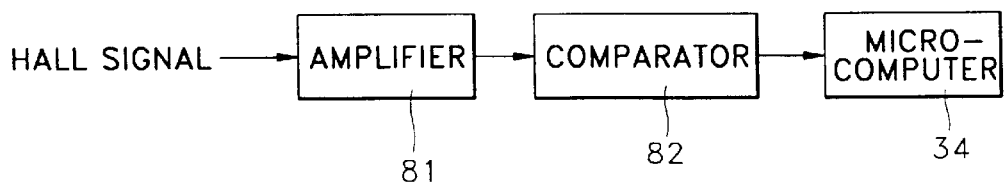
FIG. 8 is a block diagram showing a process of transmission of the signal generated from the Hall sensor to a microcomputer.

Then, a first inversion (high-to-low transition) of a signal generated from a Hall sensor (not shown) installed inside the spindle motor 31 is awaited (step 42). The signal generated from the Hall sensor is generated in response to the change of magnetic flux of due to the rotation of a plurality of alternating North and South divided magnetic poles 51, which are inside the spindle motor as shown in FIG. 5. The signal generated from the Hall sensor (hereinafter, the Hall signal) has a sine wave characteristic as shown in FIG. 6. The Hall signal, which is a weak sine wave, is amplified by an amplifier 81 as shown in FIG. 8 and converted by a comparator 82 into a rectangular wave as shown in FIG. 7 so as to be input to the microcomputer 34. The amplifier 81 and the comparator 82 of the present invention can be implemented using previously installed components inside a circuit portion (not shown) of the CD drive. Alternatively, additional components can be used, according to the circuit in FIG. 8, to making a total system circuit by incorporation with the existing circuit portion (not shown).

After waiting for the Hall signal to invert in step 42, it is determined whether the Hall signal is inverted (step 43). When the Hall signal is inverted a first time, a timer (not shown) inside the CD drive starts counting (step 44). Then, the second inversion of the Hall signal is awaited at the current position of the pickup 32 (step 45), and it is determined whether the Hall signal is inverted a second time (step 46). In case that the Hall signal is not inverted a second time in step 46, the program returns to step 45 to await the second inversion. Otherwise, the third inversion of the Hall signal at the current position of the pickup 32 is awaited (step 47), and it is determined whether the Hall signal is inverted a third time (step 48). When the third inversion of the Hall signal does not occur in step 48, the program returns to step 47 to wait the third inversion of the Hall signal.

When the third inversion of the hall signal is made, the counting of the timer stops. Then the RPM at the current position of the pickup 32 is obtained based on a counting value reached by the timer (step 49). Based on the obtained RPM and a predetermined reference RPM, the recording linear velocity of the data recorded on the CD is then determined (step 50). Thus, the measurement of the recording linear velocity of the data recorded on an arbitrary CD is completed.

As described above, in the method for measuring the recording linear velocity of the data on a CD according to the present invention, the recording linear velocity of the data recorded on the disk using the Hall signal of the spindle motor is obtained so that the generation of errors in the number of tracks according to the track movement of the pickup can be prevented and the necessary time for measuring the recording linear velocity can be curtailed.

It will be appreciated that, although the present invention has been described in terms of preferred embodiments, various changes and modifications may be made to the described embodiments without departing from the spirit and scope of the present invention.

What is claimed is:

1. A method for measuring recording linear velocity of data recorded on a compact disk (CD) loaded in a CD drive having a spindle motor for rotating the CD, said method comprising the steps of:

(a) reading data via a pickup, which is recorded in a lead-in area of said CD;

(b) awaiting a first inversion of a Hall signal, generated from a Hall sensor inside the spindle motor, at a current position of said pickup;

(c) determining whether said Hall signal is inverted a first time;

(d) starting the counting of a timer upon when it is determined in said step (c) that said Hall signal is inverted a first time;

(e) awaiting a second inversion of said Hall signal at the current position of said pickup;

(f) determining whether said Hall signal is inverted a second time;

(g) awaiting a third inversion of said Hall signal at the current position of said pickup, after a determination is made in said step (f) of the second inversion of said Hall signal;

(h) determining whether said Hall signal is inverted a third time;

(i) stopping the counting of said timer when the a determination is made in said step (h) of the third inversion of said Hall signal, and obtaining the rotational speed at the current position of said pickup based on the measured counting value; and (j) obtaining the recording linear velocity of the data recorded on said CD based on the rotational speed obtained in said step (i) and a reference rotational speed.

2. The method for measuring recording linear velocity of data recorded on a compact disk as claimed in claim 1, further comprises a step of:

(k) reading a sub-Q code at the current position of said pickup and storing the data in a memory device inside the CD drive, after said step (a).

3. The method for measuring recording linear velocity of data recorded on a compact disk as claimed in claim 1, wherein said Hall signal is used after being converted into a rectangular wave.

4. The method for measuring recording linear velocity of data recorded on a compact disk as claimed in claim 1, wherein, if said Hall signal is not inverted a first time in said step (c), the program returns to said step (b) to await the first inversion of said Hall signal.

5. The method for measuring recording linear velocity of data recorded on a compact disk as claimed in claim 1, wherein, if said Hall signal is not inverted a second time in said step (f), the program returns to said step (e) to await the second inversion of said Hall signal.

6. The method for measuring recording linear velocity of data recorded on a compact disk as claimed in claim 1, wherein, if said Hall signal is not inverted a third time in said step (h), the program returns to said step (g) to await the third inversion of said Hall signal.

7. A method for determining rotational speed of a spindle motor in CD drive for use in measuring recording linear velocity of data recorded on a compact disk (CD) loaded in the CD drive and being rotated by the spindle motor, said method comprising the steps of:

(a) reading data via a pickup, which is recorded in a lead-in area of said CD;

(b) awaiting a first inversion of a Hall signal, generated from a Hall sensor inside the spindle motor, at a current position of said pickup;

(c) determining whether said Hall signal is inverted a first time;

(d) starting the counting of a timer upon when it is determined in said step (c) that said Hall signal is inverted a first time;

(e) awaiting a second inversion of said Hall signal at the current position of said pickup;

(f) determining whether said Hall signal is inverted a second time;

(g) awaiting a third inversion of said Hall signal at the current position of said pickup, after a determination is made in said step (f) of the second inversion of said Hall signal;

(h) determining whether said Hall signal is inverted a third time; and (i) stopping the counting of said timer when the a determination is made in said step (h) of the third inversion of said Hall signal, and obtaining the rotational speed at the current position of said pickup based on the measured counting value.

8. The method for determining rotational speed of a spindle motor in CD drive as claimed in claim 7, further comprises a step of:

(j) reading a sub-Q code at the current position of said pickup and storing the data in a memory device inside the CD drive, after said step (a).

9. The method for determining rotational speed of a spindle motor in CD drive as claimed in claim 7, wherein said Hall signal is used after being converted into a rectangular wave.

10. The method for determining rotational speed of a spindle motor in CD drive as claimed in claim 7, wherein, if said Hall signal is not inverted a first time in said step (c), the program returns to said step (b) to await the first inversion of said Hall signal.

11. The method for determining rotational speed of a spindle motor in CD drive as claimed in claim 7, wherein, if said Hall signal is not inverted a second time in said step (f), the program returns to said step (e) to await the second inversion of said Hall signal.

12. The method for determining rotational speed of a spindle motor in CD drive as claimed in claim 7, wherein, if said Hall signal is not inverted a third time in said step (h), the program returns to said step (g) to await the third inversion of said Hall signal.

* * * * *